(12) United States Patent
Powell et al.

(10) Patent No.: US 9,286,559 B2
(45) Date of Patent: *Mar. 15, 2016

(54) CREATING A VIRTUAL BAR CODE FROM A PHYSICAL BAR CODE

(71) Applicant: The Code Corporation, Draper, UT (US)

(72) Inventors: George Powell, Draper, UT (US); Ryan Hoobler, Salt Lake City, UT (US); Ming Lei, Princeton Junction, NJ (US); Garrett Russell, Phoenixville, PA (US); Mark Ashby, Taylorsville, UT (US)

(73) Assignee: The Code Corporation, Draper, UT (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/605,747

(22) Filed: Jan. 26, 2015

(65) Prior Publication Data

US 2015/0129656 A1   May 14, 2015

Related U.S. Application Data

(63) Continuation of application No. 13/843,927, filed on Mar. 15, 2013, now Pat. No. 8,939,363.

(51) Int. Cl.
*G06K 15/00* (2006.01)
*G06K 19/06* (2006.01)
*G06K 7/10* (2006.01)
*G06K 1/12* (2006.01)

(52) U.S. Cl.
CPC ........... *G06K 19/06112* (2013.01); *G06K 1/121* (2013.01); *G06K 7/10712* (2013.01); *G06K 19/06103* (2013.01)

(58) Field of Classification Search
CPC ..................... G06Q 30/0601; G06K 7/10881
USPC ................................ 235/383, 462.07, 462.15
See application file for complete search history.

(56) References Cited

U.S. PATENT DOCUMENTS

| | | | | |
|---|---|---|---|---|
| 5,316,693 | A * | 5/1994 | Yuasa et al. | 252/299.01 |
| 5,786,582 | A * | 7/1998 | Roustaei et al. | 235/462.07 |
| 8,442,866 | B2 * | 5/2013 | Stone et al. | 705/26.1 |
| 8,939,363 | B2 * | 1/2015 | Powell et al. | 235/383 |
| 2007/0017992 | A1 * | 1/2007 | Burger et al. | 235/462.01 |

* cited by examiner

*Primary Examiner* — Daniel St Cyr
(74) *Attorney, Agent, or Firm* — Timothy P. O'Hagan; Austin Rapp & Hardman

(57) ABSTRACT

In accordance with the present disclosure a portable computing device may capture an image of a physical bar code, which may exist on some physical medium, such as paper, plastic, glass, etc. The physical bar code may be decoded to obtain decoded data, and the decoded data may subsequently be re-encoded to generate a virtual bar code. The virtual bar code may be rendered (e.g., on a display of a computing device, and/or on some type of physical medium) and read by a barcode reader.

13 Claims, 8 Drawing Sheets

CREATING A VIRTUAL BAR CODE FROM A PHYSICAL BAR CODE

CLAIM OF PRIORITY

This application is a continuation of U.S. patent application Ser. No. 13/843,927, filed Mar. 15, 2013, titled CREATING A VIRTUAL BAR CODE FROM A PHYSICAL BAR CODE, with inventors George Powell, Ryan Hoobler, Ming Lei, Garrett Russell and Mark Ashby, which is incorporated by reference herein.

TECHNICAL FIELD

The present disclosure relates generally to bar codes and portable computing devices that are capable of scanning bar codes. More specifically, the present disclosure relates to portable computing devices that are configured to create a virtual bar code from a physical bar code.

BACKGROUND

A bar code is an optical machine-readable representation of information. Originally, bar codes represented information by varying the widths and spacings of parallel lines. These types of bar codes may be referred to as linear or one-dimensional (1D) bar codes. Later, bar codes evolved into rectangles, dots, hexagons and other geometric patterns in two dimensions (2D). Although 2D systems use a variety of symbols, they are generally referred to as bar codes as well.

Devices for identifying or extracting information from bar codes are generally referred to as bar code scanners. An image-based bar code scanner includes a camera for capturing an image of a bar code to be scanned. A decoder then processes the image and extracts the information contained in the bar code.

In the last several decades, the use of portable computing devices has become common. In particular, advances in electronic technology have reduced the cost of increasingly complex and useful portable computing devices. Cost reduction and consumer demand have proliferated the use of portable computing devices such that they are practically ubiquitous in modern society. Examples of portable computing devices include smartphones, tablet computers, laptop computers, portable media players, digital cameras, camcorders, GPS navigation devices, etc.

As the use of portable computing devices has expanded, so has the demand for new and improved features of portable computing devices. More specifically, portable computing devices that perform new functions and/or that perform functions faster, more efficiently or with higher quality are often sought after.

Many portable computing devices include a camera. Therefore, with appropriate software and/or firmware, such portable computing devices can function as bar code scanners.

SUMMARY

The present disclosure relates generally to a portable computing device that is configured to create a virtual bar code from a physical bar code. More specifically, in accordance with the present disclosure a portable computing device may scan a physical bar code, which may involve capturing a digital image of the physical bar code. The physical bar code may be decoded to obtain decoded data, and the decoded data may subsequently be re-encoded to generate a virtual bar code.

As used herein, the term "physical bar code" refers to a bar code that exists on some physical medium, such as paper, plastic, glass, etc. In contrast, the term "virtual bar code" refers to a bar code that exists in electronic form. A virtual bar code may be rendered (e.g., on a display of a computing device, and/or on some type of physical medium) and subsequently scanned by a bar code scanner. Advantageously, the virtual bar code may be free of one or more distortions that may be present in the digital image of the physical bar code.

The virtual bar code may be encoded in accordance with the same symbology or a different symbology than the physical bar code. In some configurations, the virtual bar code may include supplemental information in addition to the decoded data from the physical bar code.

DETAILED DESCRIPTION

Figure 1:
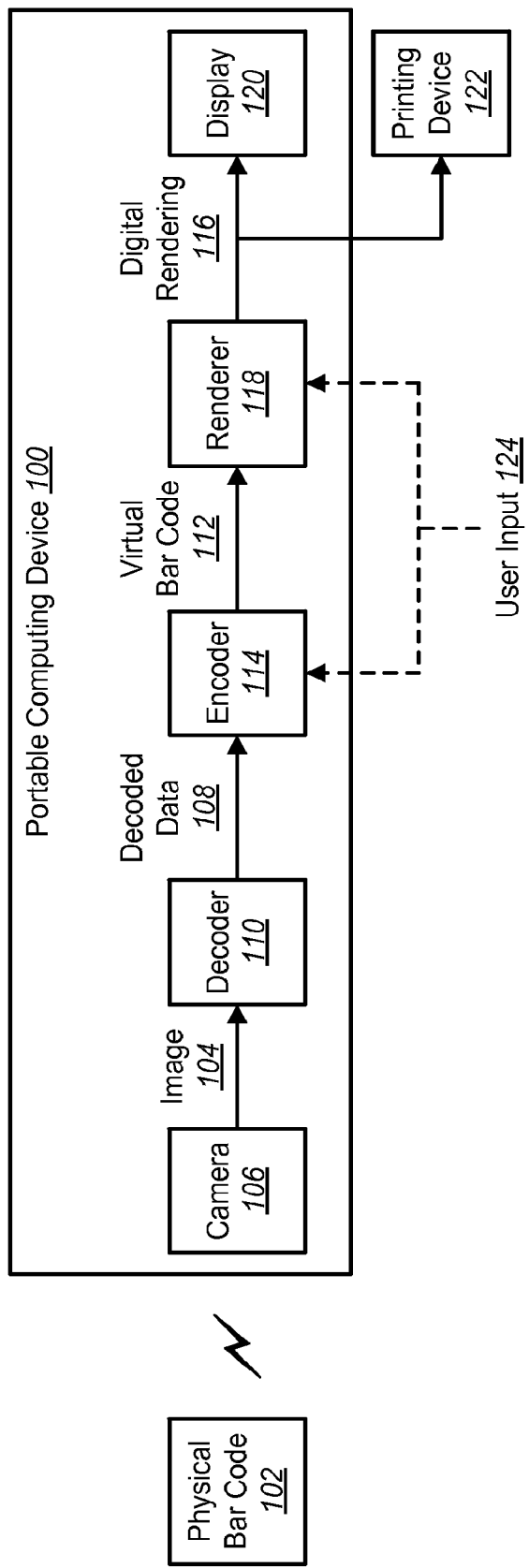
FIG. 1 illustrates one configuration of a portable computing device in accordance with the present disclosure.

FIG. 1 illustrates one configuration of a portable computing device 100 in accordance with the present disclosure. The portable computing device 100 may be configured to scan a physical bar code 102. The physical bar code 102 may comprise an optical, machine-readable representation of information. The physical bar code 102 may be a one-dimensional or a two-dimensional bar code.

Scanning the physical bar code 102 may include capturing a digital image 104 of the physical bar code 102. The portable computing device 100 is shown with a camera 106 for implementing this functionality. The digital image 104 may include a two-dimensional array of pixel data.

The portable computing device 100 may be configured to decode the physical bar code 102 to obtain decoded data 108. The portable computing device 100 is shown with a decoder 110 for implementing this functionality. As indicated above, the physical bar code 102 may comprise an optical, machine-readable representation of information. Decoding the physical bar code 102 may include processing the digital image 104 in order to extract this information from the physical bar code 102. In other words, decoding the physical bar code 102 may include transforming the optical, machine-readable representation of the information back into the original information. Ideally, the decoded data 108 that is obtained by decoding the physical bar code 102 is identical to the information that was originally encoded to create the physical bar code 102.

The portable computing device 100 may be configured to re-encode the decoded data 108 to generate a virtual bar code 112. The portable computing device 100 is shown with an encoder 114 for implementing this functionality. Re-encoding the decoded data 108 may include generating an optical, machine-readable representation of the decoded data 108. If the decoded data 108 is identical to the information that was originally encoded to create the physical bar code 102, then the physical bar code 102 and the virtual bar code 112 may be two separate optical, machine-readable representations of the same information.

The portable computing device 100 may generate a digital rendering 116 of the virtual bar code 112, and output the digital rendering 116 of the virtual bar code 112 to a display 120 of the portable computing device 100 and/or to a printing device 122. The portable computing device 100 is shown with a renderer 118 for implementing this functionality.

When the digital rendering 116 of the virtual bar code 112 is output to the display 120, a visual representation of the virtual bar code 112 may appear on the display 120. The display 120 may be part of the portable computing device 100. The display 120 may be a flat panel display that is based on any suitable display technology, including liquid crystal display (LCD), light-emitting diode (LED), gas plasma, electroluminescence, etc. The display 120 may be a touchscreen, i.e., it may be designed to recognize the location of touch on its surface.

When the digital rendering 116 of the virtual bar code 112 is output to the printing device 122, a visual representation of the virtual bar code 112 may be printed on paper or another physical medium. The portable computing device 100 may be in electronic communication with the printing device 122 via one or more computer networks, which may be wired or wireless. Alternatively, the portable computing device 100 may be in direct electronic communication with the printing device 122.

Once the digital rendering 116 of the virtual bar code 112 has been generated and output to the display 120 or to the printing device 122, a bar code scanner may be used to scan the virtual bar code 112. The digital rendering 116 of the virtual bar code 112 may be scanned directly off of the display 120, and/or off of whatever physical medium is used by the printing device 122 (e.g., paper).

It should be noted that the portable computing device 100 does not merely render the digital image 104 of the physical bar code 102 to the display 120 or to the printing device 122. Instead, the portable computing device 100 decodes the physical bar code 102 and then re-encodes the decoded data 108 to generate the virtual bar code 112, which may then be rendered and output to the display 120 or to the printing device 122. In other words, the virtual bar code 112 is not merely an image of the physical bar code 102 (like the digital image 104), but instead is a separately encoded bar code that is maintained in electronic form.

The operations of scanning and decoding the physical bar code 102 may be performed in response to user input 124. The portable computing device 100 may generate the virtual bar code 112, generate the digital rendering 116 of the virtual bar code 112, and output the digital rendering 116 of the virtual bar code 112 automatically in response to the physical bar code 102 being scanned and decoded. In other words, these operations may be performed in response to the physical bar code 102 being scanned and decoded, without the need for any additional user input 124.

Alternatively, the portable computing device 100 may generate the virtual bar code 112, generate the digital rendering 116 of the virtual bar code 112, and/or output the digital rendering 116 of the virtual bar code 112 in response to user input 124. For example, once the physical bar code 102 is scanned and decoded, the decoded data 108 may be stored in memory. Subsequently, in response to user input 124, the portable computing device 100 may retrieve the decoded data 108 from memory, generate the virtual bar code 112, generate the digital rendering 116 of the virtual bar code 112, and output the digital rendering 116 of the virtual bar code 112.

Alternatively, the virtual bar code 112 may be automatically generated and stored in memory in response to the physical bar code 102 being scanned and decoded. Subsequently, the portable computing device 100 may retrieve the virtual bar code 112 from memory, generate the digital rendering 116 of the virtual bar code 112, and output the digital rendering 116 of the virtual bar code 112 in response to user input 124.

The physical bar code 102 and the virtual bar code 112 may both be encoded in accordance with the same symbology. The "symbology" of a bar code refers to the system of encoding that is used to create the bar code. Some examples of bar code symbologies include UPC, Data Matrix, QR Code, PDF417, MaxiCode, etc. If the physical bar code 102 and the virtual bar code 112 are both encoded in accordance with the same symbology, then the appearance of the digital rendering 116 of the virtual bar code 112 (on the display 120 and/or on the physical medium output by the printing device 122) may be identical, or at least substantially identical, to the appearance of the physical bar code 102. Alternatively, the virtual bar code 112 may be encoded in accordance with a different symbology than the physical bar code 102. In this case, the appearance of the digital rendering 116 of the virtual bar code 112 may be different than the appearance of the physical bar code 102.

Figure 2:
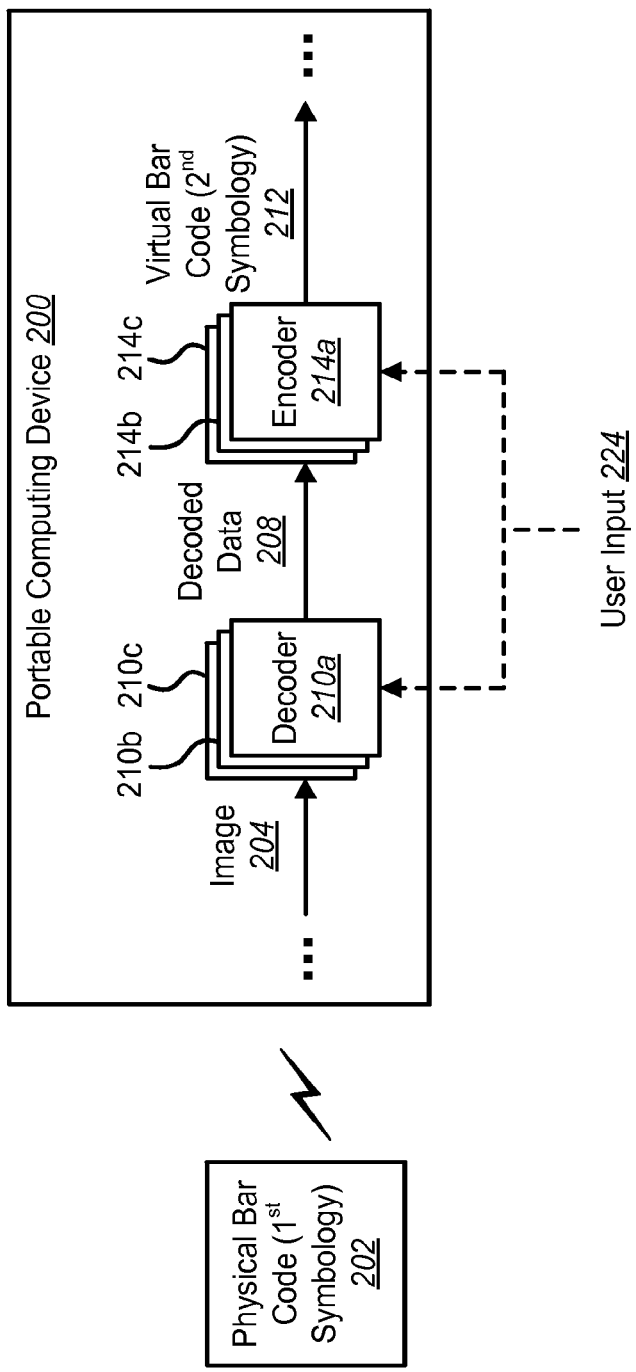
FIG. 2 illustrates another configuration of a portable computing device in accordance with the present disclosure.

FIG. 2 illustrates another configuration of a portable computing device 200 in accordance with the present disclosure. The portable computing device 200 shown in FIG. 2 may be configured similarly to the portable computing device 100 shown in FIG. 1, except as described below.

In the configuration depicted in FIG. 2, the virtual bar code 212 may be encoded in accordance with a different symbology than the physical bar code 202. In FIG. 2, the physical bar code 202 is labeled "1st symbology" to indicate that the physical bar code 202 may be encoded in accordance with a first symbology (e.g., the UPC symbology). The virtual bar code 212 is labeled "2nd symbology" to indicate that the virtual bar code 212 may be encoded in accordance with a second symbology (e.g., the Data Matrix symbology) that is different than the first symbology.

There may be a plurality of available symbologies that may be used to encode the virtual bar code 212. The portable computing device 200 may include a plurality of encoders 214. Each of these encoders 214 may correspond to a different symbology. For example, a first encoder 214a may encode data in accordance with a first symbology (e.g., the UPC symbology), a second encoder 214b may encode data in accordance with a second symbology (e.g., the Data Matrix symbology), and a third encoder 214c may encode data in accordance with a third symbology (e.g., the QR Code symbology).

The portable computing device 200 may receive user input 224 that indicates a selection of the second symbology (i.e., the symbology that is used to encode the virtual bar code 212) from among the plurality of available symbologies. More specifically, user input 224 may be received that indicates which of the encoders 214 should be used to re-encode the decoded data 208 in order to generate the virtual bar code 212. For example, the user input 224 may include an indication of a specific symbology (e.g., the Data Matrix symbology), and then the encoder 214 corresponding to that symbology (e.g., the encoder 214b corresponding to the Data Matrix symbology) may be automatically selected and used to re-encode the decoded data 208.

The portable computing device 200 may also include a plurality of decoders 210. Each of these decoders 210 may correspond to a different symbology. For example, a first decoder 210a may decode bar codes that are encoded in accordance with a first symbology (e.g., the UPC symbology), a second decoder 210b may decode bar codes that are encoded in accordance with a second symbology (e.g., the Data Matrix symbology), and a third decoder 210c may decode bar codes that are encoded in accordance with a third symbology (e.g., the QR Code symbology).

User input 224 may be received that indicates which of these decoders 210 should be used to attempt to decode the physical bar code 202. For example, if the user knows that the physical bar code 202 is encoded in accordance with a first symbology (e.g., the UPC symbology), then the user input 224 may include an indication of the first symbology, and the decoder 210 corresponding to the first symbology (e.g., the decoder 210a corresponding to the UPC symbology) may be automatically selected in response to the user input 224 and used to attempt to decode the physical bar code 202.

Alternatively, one of the decoders 210 may be automatically selected. For example, there may be a default decoder 210, or a decoder 210 may be randomly selected. If decoding fails, then another one of the decoders 210 may be selected. This process of trial and error may continue until a decoder 210 is identified that successfully decodes the physical bar code 202.

The selection of the decoder 210 that is used to decode the physical bar code 202 may be independent of the selection of the encoder 214 that is used to encode the virtual bar code 212. For example, the decoder 210a corresponding to a first symbology (e.g., the UPC symbology) may be selected, and the encoder 214b corresponding to a second symbology (e.g., the Data Matrix symbology) may be selected. Thus, the portable computing device 200 may be configured to transform a physical bar code 202 that was encoded in accordance with a first symbology (e.g., the UPC symbology) into a virtual bar code 212 that is encoded in accordance with a second symbology (e.g., the Data Matrix symbology). The user of the portable computing device 200 may consider the second symbology to be more desirable than the first symbology for a particular purpose.

Figure 3:
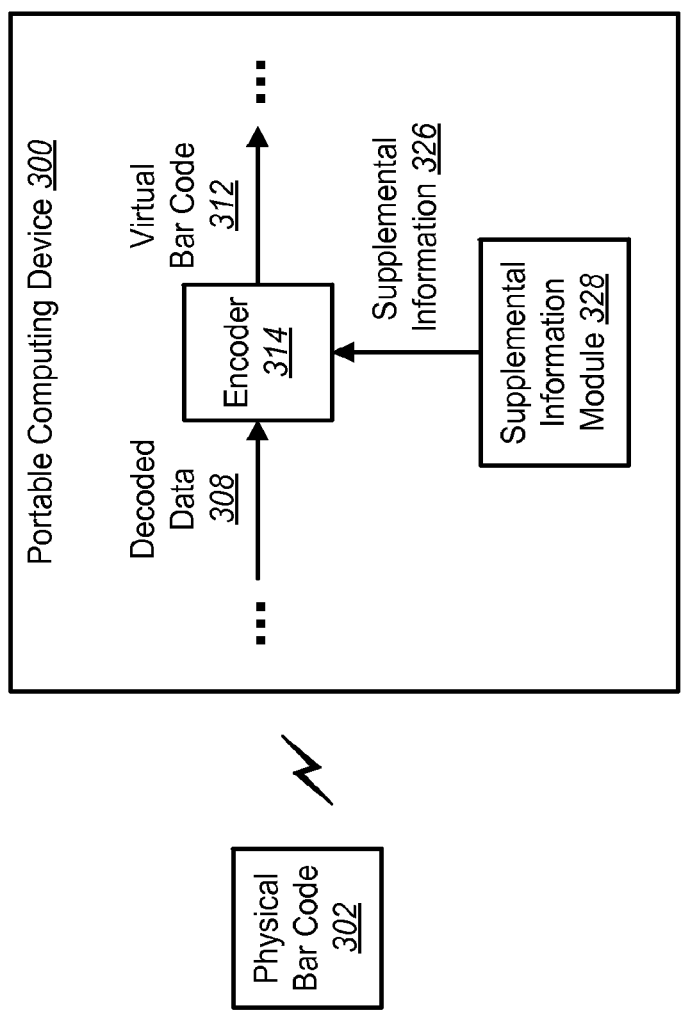
FIG. 3 illustrates another configuration of a portable computing device in accordance with the present disclosure.

FIG. 3 illustrates another configuration of a portable computing device 300 in accordance with the present disclosure. The portable computing device 300 shown in FIG. 3 may be configured similarly to the portable computing device 100 shown in FIG. 1, except as described below.

In the depicted configuration, the portable computing device 300 may determine supplemental information 326 that is related to the physical bar code 302. The portable computing device 300 is shown with a supplemental information module 328 for implementing this functionality. The encoder 314 may append the supplemental information 326 to the decoded data 308, and encode the combination of the decoded data 308 and the supplemental information 326 to generate the virtual bar code 312. Thus, the virtual bar code 312 may be an optical, machine-readable representation of both the information that was originally encoded to create the physical bar code 302 and also the supplemental information 326.

FIG. 3 shows the supplemental information module 328 as part of the portable computing device 300. Alternatively, however, the supplemental information module 328 may be located in a separate device that is in electronic communication with the portable computing device 300.

There are many different types of supplemental information 326 that may be utilized in accordance with the present disclosure. As one example, the supplemental information module 328 may be a global positioning system (GPS) receiver, and the supplemental information 326 may include GPS coordinates (e.g., longitude and latitude) provided by the GPS receiver. Including this type of information in the virtual bar code 312 may make it possible for someone who subsequently scans the virtual bar code 312 to be able to determine the precise location (in terms of GPS coordinates) where the virtual bar code 312 was generated (and, by inference, where the physical bar code 302 was scanned).

As another example, the supplemental information 326 may indicate information about a location where the physical bar code 302 is scanned. This location information may be generated based on GPS coordinates, user input, etc. In this context, the term "location" should be interpreted broadly to include any site or position where the physical bar code 302 may be situated when it is scanned. The term "location" should also be interpreted to encompass varying degrees of specificity. For example, the supplemental information 326 may indicate a particular retail store (e.g., Best Buy®), a specific location of a retail store (e.g., the Best Buy® located in downtown Salt Lake City, Utah), a particular section of a specific location of a retail store (e.g., aisle 7A within the Best Buy® located in downtown Salt Lake City, Utah), etc.

As another example, the supplemental information module 328 may be configured to perform a timekeeping function, and the supplemental information 326 may include a time stamp that indicates when the physical bar code 302 is scanned. In this context, the term "time stamp" should be interpreted to encompass varying degrees of specificity. For example, the time stamp may include a year (e.g., 2013), a month and year (e.g., February 2013), a date (e.g., Feb. 21, 2013), a date and time (e.g., Feb. 21, 2013 at 4:28 p.m.), etc.

As another example, the supplemental information 326 may include information decoded from at least one additional bar code. Several physical bar codes (e.g., the physical bar code 302 and several other bar codes) may be scanned. The information from all of the bar codes may be combined together and represented by a single virtual bar code 312.

As another example, the supplemental information 326 may include a unique identifier corresponding to the information that the physical bar code 302 represents. For example, if the physical bar code 302 includes information about a product for sale in a store, the unique identifier may correspond to that product. If the physical bar code 302 includes information about a ticket for entering a sporting or entertainment event, the unique identifier may correspond to that sporting or entertainment event.

Figure 4:
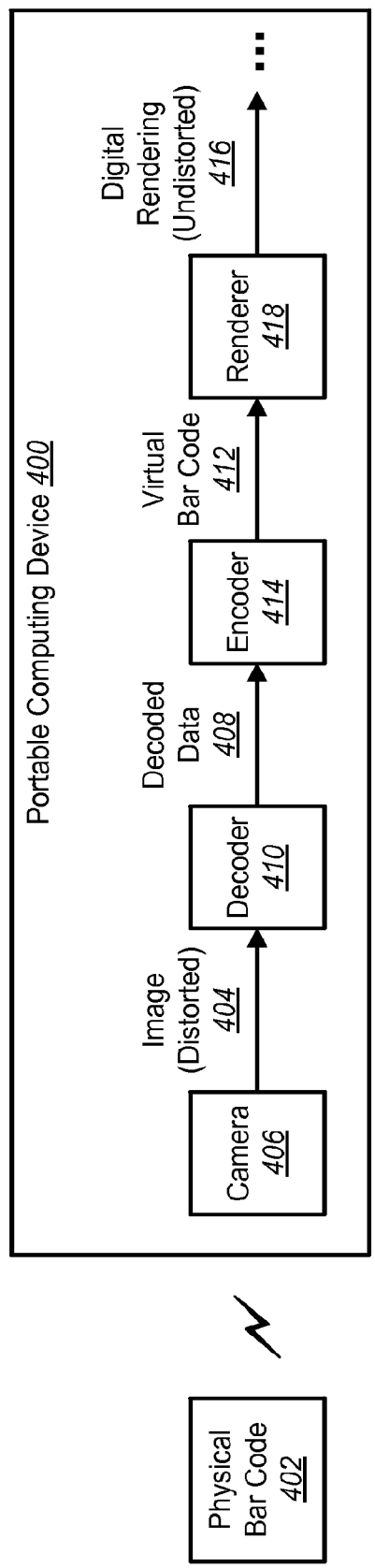
FIG. 4 illustrates another configuration of a portable computing device in accordance with the present disclosure.

FIG. 4 illustrates another configuration of a portable computing device 400 in accordance with the present disclosure. The portable computing device 400 shown in FIG. 4 may be configured similarly to the portable computing device 100 shown in FIG. 1, except as described below.

In the depicted configuration, the digital image 404 of the physical bar code 402 may include at least one distortion. To indicate this, the digital image 404 is labeled as "distorted" in FIG. 4. The distortion(s) may be present in the physical bar code 402 itself. Alternatively, the distortion(s) may not be present in the physical bar code 402, but may be introduced into the digital image 404 due to problems with the way that the digital image 404 is captured (e.g., imperfect alignment of the camera 406 with the physical bar code 402). Alternatively, or in addition, there may be distortion(s) present in the physical bar code 402 and there also may be distortion(s) introduced into the digital image 404 due to problems with the way that the digital image 404 is captured.

As one example, the digital image 404 of the physical bar code 402 may include a recti-linear distortion. A recti-linear distortion may be introduced due to problems with the way that the digital image 404 is captured. For example, the physical bar code 402 may have a rectangular shape, but the physical bar code 402 may not appear to be rectangular in the digital image 404 due to imperfect alignment of the camera 406 and the physical bar code 402. Alternatively, the physical bar code 402 itself may include a recti-linear distortion (e.g., it was intended to have a rectangular shape, but it does not actually have a rectangular shape due to a printing error).

As another example, the digital image 404 of the physical bar code 402 may include a contrast distortion. Ideally, there is a significant contrast between the symbols (in a 2D bar code) or parallel lines (in a 1D bar code) and the background of the bar code (e.g., the symbols/parallel lines may be black and the background may be white). If there is a contrast distortion in the digital image 404 of the physical bar code 402, the contrast between the symbols/parallel lines of the physical bar code 402 and the background may appear to be different for some parts of the physical bar code 402 than for other parts of the physical bar code 402.

As another example, the physical bar code 402 may include a printing distortion. For instance, the physical bar code 402 may be printed out of specification, so that the physical bar code 402 does not satisfy one or more defined requirements that are related to its readability. Alternatively, or in addition, the physical bar code 402 may be damaged or contaminated.

Because the physical bar code 402 is decoded (by the decoder 410) and the decoded data 408 is re-encoded (by the encoder 414) to generate the virtual bar code 412, the digital rendering 416 of the virtual bar code 412 (generated by the renderer 418) may not include the distortion(s) that are present in the digital image 404 of the physical bar code 402. To indicate this, the digital rendering 416 in FIG. 4 is labeled as "undistorted." Thus, the configuration shown in FIG. 4 may make it possible to improve the quality of a physical bar code 402 that includes one or more distortions. Alternatively, or in addition, the depicted configuration may make it possible to correct distortion(s) that may be present in a digital image 404 of a physical bar code 402.

If the physical bar code 402 itself is distorted (for any of the reasons mentioned above), it may be difficult for a standard bar code scanner to read the physical bar code 402. However, the operations described above may result in the creation of a virtual bar code 412 that can be read by a standard bar code scanner. The decoder 410 within the portable computing device 400 may be stronger (i.e., have greater decoding capabilities) than an average decoder, so that it can decode a distorted physical bar code 402, even if a standard bar code scanner would not be able to decode the distorted physical bar code 402. Then, as mentioned above, the decoded data 408 may be re-encoded to generate the virtual bar code 412. The digital rendering 416 of the virtual bar code 412 may be considerably easier for an average bar code scanner to read than the distorted physical bar code 402.

Figure 5:
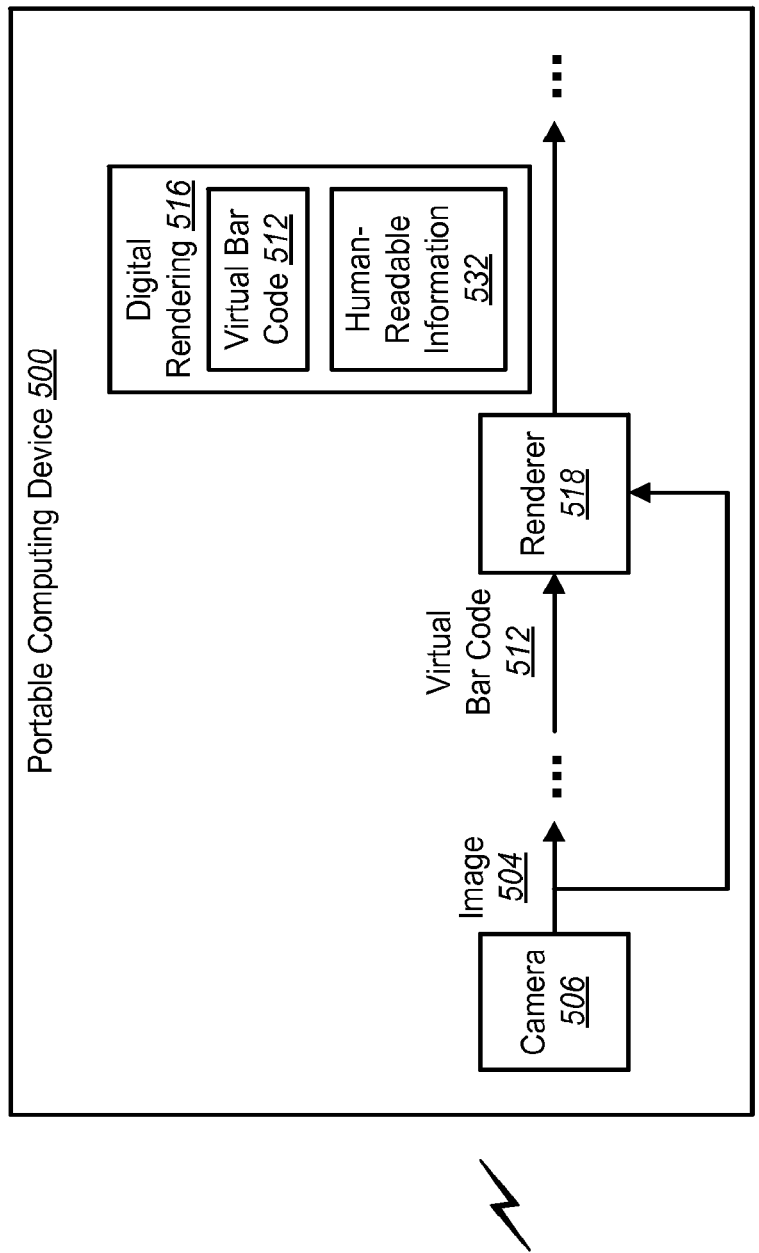
FIG. 5 illustrates another configuration of a portable computing device in accordance with the present disclosure.

FIG. 5 illustrates another configuration of a portable computing device 500 in accordance with the present disclosure. The portable computing device 500 shown in FIG. 5 may be configured similarly to the portable computing device 100 shown in FIG. 1, except as described below.

In the depicted configuration, scanning the physical bar code 502 may comprise capturing an image 504 (via a camera 506) of a document 530 that comprises the physical bar code 502 and human-readable information 532. In other words, the physical bar code 502 may be located on a document 530, and there may be human-readable information 532 on the document 530 in addition to the physical bar code 502. The document 530 may be, for example, a label on a product for sale in a store, a customer loyalty card, a patient identification wristband, an airline boarding pass, a ticket for entering a sporting or entertainment event, a label on a parcel being mailed, an advertisement in a newspaper or magazine, etc.

The portable computing device 500 may also be configured to generate a digital rendering 516 of the document 530 with the virtual bar code 512 in place of the physical bar code 502. In other words, the digital rendering 516 of the document 530 may appear similar or identical to the document 530 itself, except that the digital rendering 516 may include the virtual bar code 512 in place of the physical bar code 502. The renderer 518 may receive the digital image 504 of the document 530 and the virtual bar code 512 as input.

Figure 6:
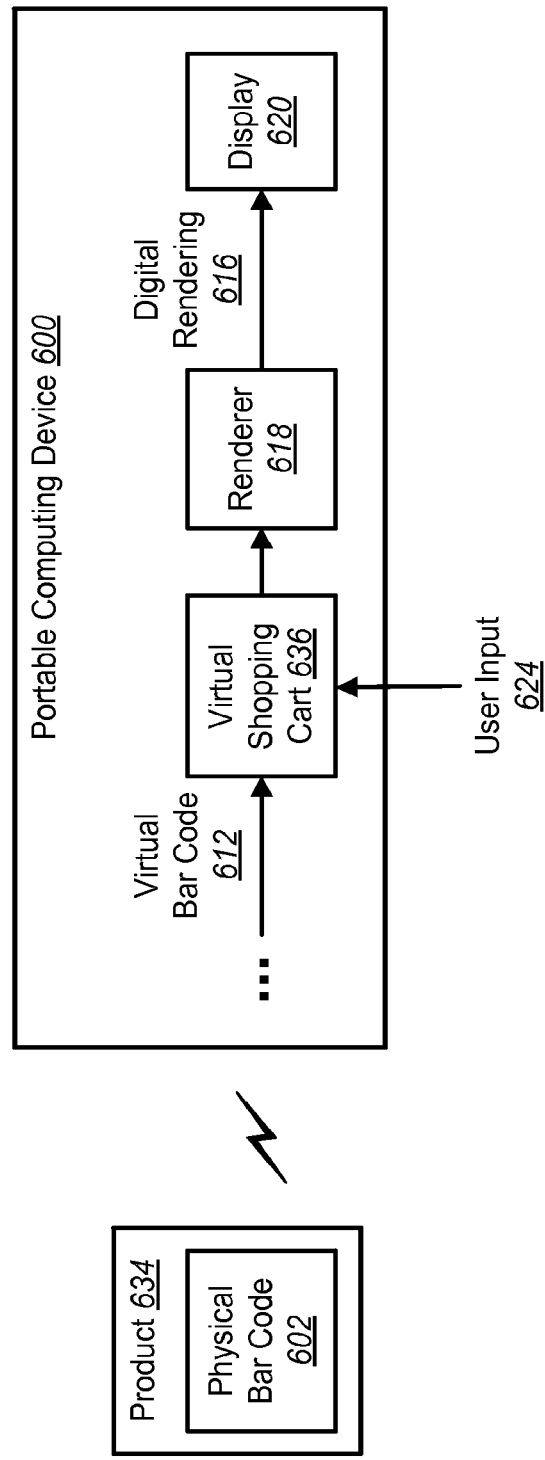
FIG. 6 illustrates another configuration of a portable computing device in accordance with the present disclosure.

FIG. 6 illustrates another configuration of a portable computing device 600 in accordance with the present disclosure. The portable computing device 600 shown in FIG. 6 may be configured similarly to the portable computing device 100 shown in FIG. 1, except as indicated below.

In the depicted configuration, the physical bar code 602 may correspond to a product 634 in a store. For example, the physical bar code 602 may be located directly on (e.g., may be affixed to) the product 634. Alternatively, the physical bar code 602 may be located on a price tag or other label that identifies or otherwise corresponds to the product 634.

Once the virtual bar code 612 has been generated, the portable computing device 600 may be configured to associate the virtual bar code 612 with a virtual shopping cart 636. The virtual shopping cart 636 may be analogous to a physical shopping cart. When a user of the portable computing device 600 wishes to purchase a product 634, the user may add the product 634 to his/her virtual shopping cart 636 by using the portable computing device 600 to scan the physical bar code 602 corresponding to the product 634.

In some situations it may be more beneficial for a shopper to add the product 634 to his/her virtual shopping cart 636 rather than adding it to a physical shopping cart. For example, the product 634 may be an extremely large or heavy item, so that adding the product 634 to a physical shopping cart may be inconvenient. As another example, the product 634 may be expensive, and for security reasons the store may keep the actual product 634 away from the public shopping area in a more secure location. In that situation, a tag or label corresponding to the product 634 may be located in the public shopping area, and the physical bar code 602 may be located on the tag or label.

The portable computing device 600 may be configured to generate a digital rendering 616 of the virtual bar code 612 and output the digital rendering 616 to a display 620 of the portable computing device 600 in response to user input 624 to display contents of the virtual shopping cart 634. For example, when a shopper is ready to purchase the product 634, the shopper may take the portable computing device 600 to a checkout register and provide user input 624 that causes the contents of the virtual shopping cart 634, including the virtual bar code 612, to be displayed. A clerk at the checkout register may use a bar code scanner to scan the digital rendering 616 of the virtual bar code 612, thereby identifying the product 634 that the shopper wishes to purchase.

Figure 7:
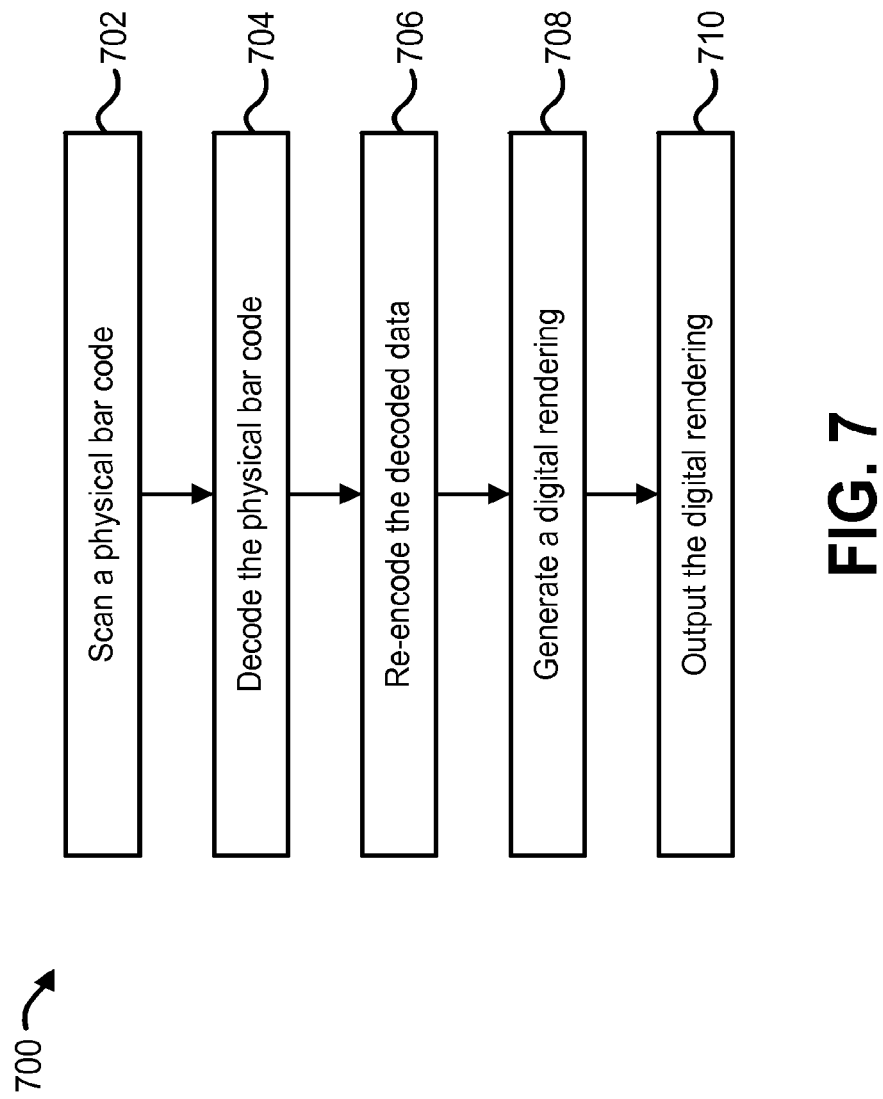
FIG. 7 illustrates a method that may be implemented by a portable computing device in accordance with the present disclosure.

FIG. 7 illustrates a method 700 that may be implemented by a portable computing device 100 in accordance with the present disclosure. The portable computing device 100 may scan 702 a physical bar code 102. Scanning the physical bar code 102 may include capturing a digital image 104 of the physical bar code 102.

The portable computing device 100 may decode 704 the physical bar code 102 to obtain decoded data 108. Decoding 704 the physical bar code 102 may include processing the digital image 104 in order to extract information from the physical bar code 102. At some subsequent point in time after the physical bar code 102 is decoded, the portable computing device 100 may re-encode 706 the decoded data 108 to generate a virtual bar code 112.

The portable computing device 100 may generate 708 a digital rendering 116 of the virtual bar code 112, and output 710 the digital rendering 116 of the virtual bar code 112 to a display 120 of the portable computing device 100 and/or to a printing device 122.

Figure 8:
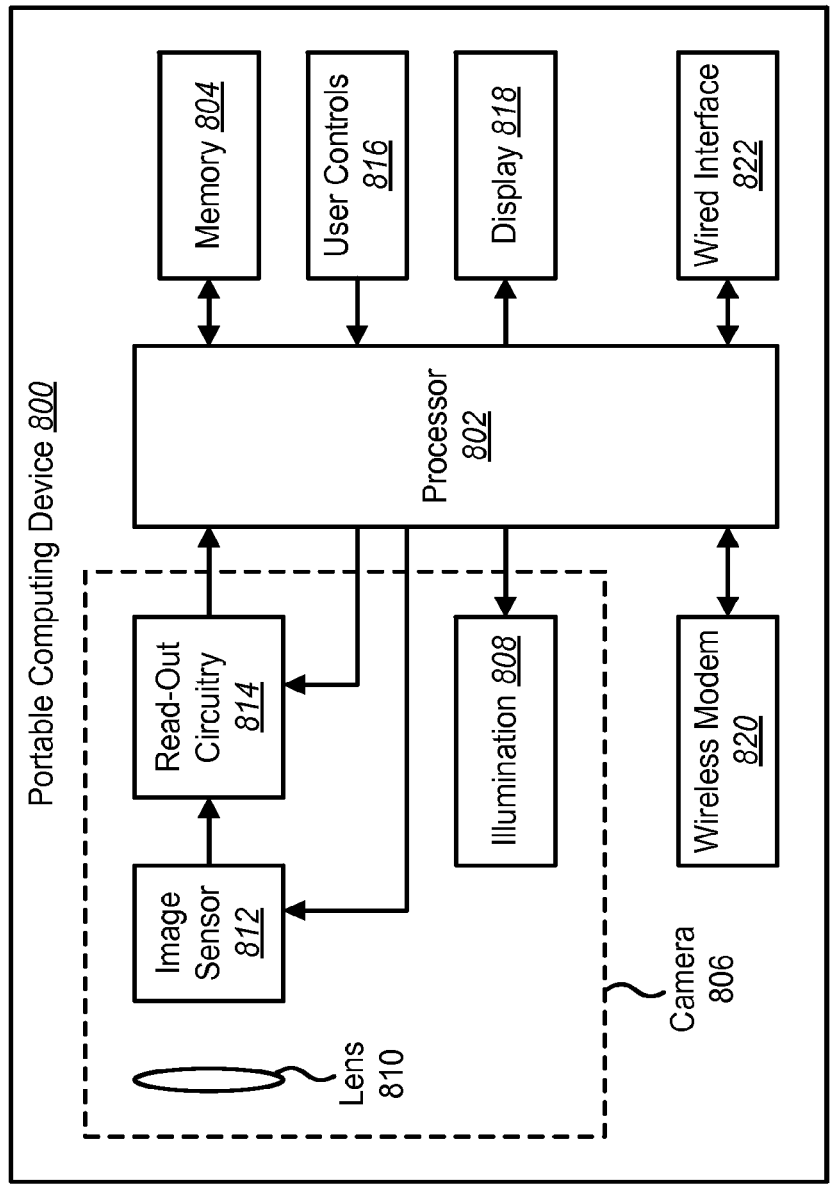
FIG. 8 illustrates various components that may be utilized in a portable computing device.

FIG. 8 illustrates various components that may be utilized in a portable computing device 800. Any of the portable computing devices 100, 200, 300, 400, 500, 600 described previously may include some or all of the components of the portable computing device 800.

The portable computing device 800 includes a processor 802. The processor 802 may be a general purpose single- or multi-chip microprocessor (e.g., an ARM), a special purpose microprocessor (e.g., a digital signal processor (DSP)), a microcontroller, a programmable gate array, etc. The processor 802 may be referred to as a central processing unit (CPU). Although just a single processor 802 is shown in the portable computing device 800 of FIG. 8, in an alternative configuration, a combination of processors (e.g., an ARM and DSP) could be used.

The portable computing device 800 also includes memory 804 in electronic communication with the processor 802. That is, the processor 802 can read information from and/or write information to the memory 804. The memory 804 may be any electronic component capable of storing electronic information. The memory 804 may be random access memory (RAM), read-only memory (ROM), magnetic disk storage media, optical storage media, flash memory devices in RAM, on-board memory included with the processor 802, programmable read-only memory (PROM), erasable programmable read-only memory (EPROM), electrically erasable PROM (EEPROM), registers, and so forth, including combinations thereof.

Data and instructions may be stored in the memory 804. The instructions may include one or more programs, routines, sub-routines, functions, procedures, etc. The instructions may include a single computer-readable statement or many computer-readable statements. The instructions may be executable by the processor 802 to implement one or more of the methods, functions and procedures described above. Executing the instructions may involve the use of the data that is stored in the memory 804.

The portable computing device 800 may include several components that may collectively be referred to as a camera 806. Illumination components 808 within the camera 806 may be activated so as to illuminate a target area. The illumination components 808 may include light-emitting diodes (LEDs) and appropriate control circuitry. One or more lenses 810 within the camera 806 may focus light reflected from item(s) within the target area (e.g., a bar code) onto an image sensor 812. The image sensor 812 may be a solid-state photo-detecting device containing a relatively large number of light-sensitive pixels that are arranged in horizontal rows and vertical columns. Read-out circuitry 814 may electronically read the pixels within the image sensor 812 in order to obtain a digital image.

The portable computing device 800 may include one or more user controls 816 that may be used to provide user input. Examples of different kinds of user controls 816 include one or more buttons, a touchscreen, a keyboard (actual and/or virtual), a microphone, a trackball, a lightpen, etc.

The portable computing device 800 may include a display 818. The display 818 may utilize any suitable image projection technology, such as a liquid crystal display (LCD), light-emitting diode (LED), gas plasma, electroluminescence, etc. The display 818 may be a touchscreen. A display controller may also be provided, for converting data stored in the memory 804 into text, graphics, and/or moving images (as appropriate) shown on the display 818.

The portable computing device 800 may include one or more communication interfaces for communicating with other electronic devices. For example, the portable electronic device 800 may include a wireless modem 820 that allows the portable computing device 800 to be connected to a wireless network. Alternatively, or in addition, the portable computing device 800 may include a wired communication interface 822 (e.g., a USB interface).

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, components, elements, structures, etc., described in connection with any one of the configurations described herein may be combined with one or more of the functions, procedures, components, elements, structures, etc., described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A portable computing device that is configured to:
    capture a digital image of a physical bar code that comprises an optical, machine-readable representation of information, the digital image comprising at least one distortion;
    decode the physical bar code to obtain decoded data; and
    re-encode the decoded data to generate a virtual bar code and output, on a display of the portable computing device, a digital rendering of the virtual bar code that does not comprise the at least one distortion.

2. The portable computing device of claim 1, wherein the portable computing device generates the virtual bar code, generates the digital rendering of the virtual bar code, and outputs the digital rendering of the virtual bar code to the display automatically in response to an image of the physical bar code being captured and decoded.

3. The portable computing device of claim 1, wherein the portable computing device generates the digital rendering of the virtual bar code and outputs the digital rendering of the virtual bar code to the display in response to user input.

4. The portable computing device of claim 1, wherein the virtual bar code is encoded in accordance with a different symbology than the physical bar code.

5. The portable computing device of claim 4, wherein the portable computing device is further configured to receive user input that indicates a selection of the second symbology from among a plurality of available symbologies.

6. The portable computing device of claim 1, wherein the physical bar code and the virtual bar code are both encoded in accordance with the same symbology.

7. The portable computing device of claim 1, wherein the at least one distortion comprises a recti-linear distortion.

8. The portable computing device of claim 1, wherein the at least one distortion comprises a contrast distortion.

9. The portable computing device of claim 1, wherein the at least one distortion comprises a printing distortion.

10. The portable computing device of claim 1, wherein the physical bar code is damaged or contaminated.

11. A portable computing device that is configured to:
   capture an image of a document that comprises: i) a physical bar code that comprises an optical, machine-readable representation of information; and ii) human-readable information;
   decode the physical bar code to obtain decoded data; and
   re-encode the decoded data to generate a virtual bar code and output a digital rendering of the document with the virtual bar code in place of the physical bar code on a display of the portable computing device.

12. The portable computing device of claim 11, wherein the portable computing device generates the virtual bar code, generates the digital rendering of the document, and outputs the digital rendering of the document to the display automatically in response to an image of the physical bar code being captured and decoded.

13. The portable computing device of claim 11, wherein the portable computing device generates the digital rendering of the document and outputs the digital rendering of the document to the display in response to user input.

* * * * *